Dec. 4, 1934.   C. V. KOONS   1,983,137

REVERSING MECHANISM

Filed April 20, 1932   2 Sheets-Sheet 1

Inventor:
Charles V. Koons
by his Attorneys
Hauson & Hauson

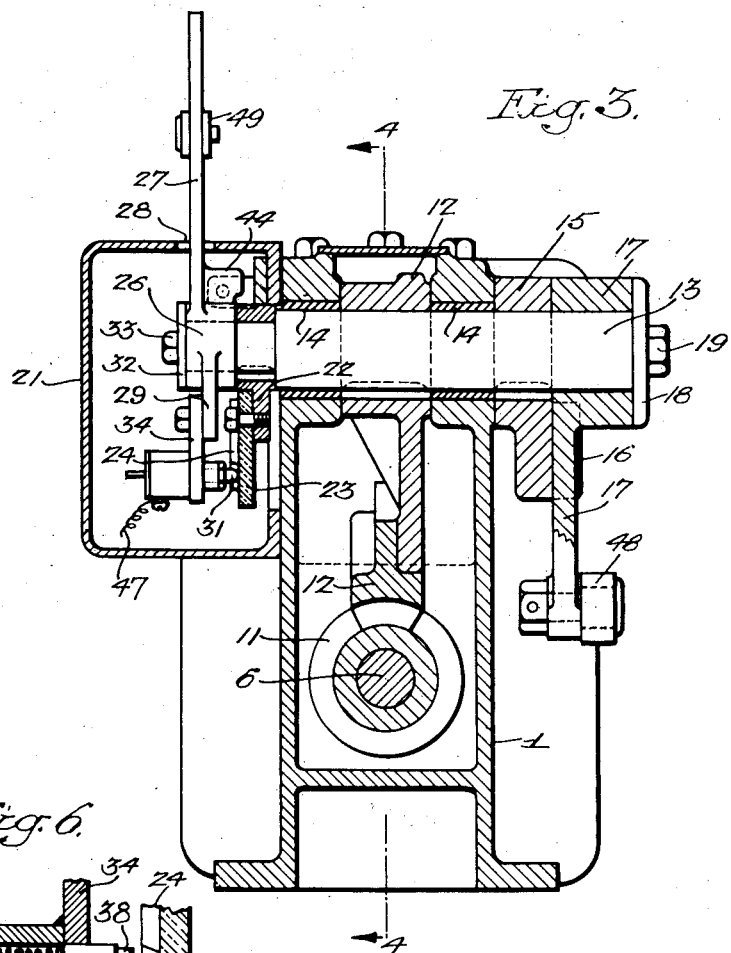

Patented Dec. 4, 1934

1,983,137

UNITED STATES PATENT OFFICE 1,983,137

REVERSING MECHANISM

Charles V. Koons, Philadelphia, Pa., assignor to American Engineering Company, Philadelphia, Pa., a corporation of Pennsylvania Application April 20, 1932, Serial No. 606,443

1 Claim. (Cl. 172—239)

This invention relates to improvements in mechanism for operating reversely moving parts such for example as the movable elements of reverse clutch mechanism, and an object of the invention is to provide a device of the stated character that is simple in construction, contains a minimum of parts, and is both efficient and reliable.

Another object of the invention is to provide an electro mechanical device of the character set forth incorporating a follow-up mechanism of novel form that functions automatically to coördinate the movement of the actuating element with the resulting movement of the actuated element.

A further object of the invention involving a specific application of my device is to provide an electromechanical mechanism of simple construction and efficient operating characteristics well adapted for operation of a reversing clutch mechanism controlling the connection between an engine or motor and the propeller of marine vessels.

Still another object of the invention is to provide a mechanism of the character set forth adapted for remote control.

The invention further resides in certain novel structural details and in a novel arrangement of parts hereinafter set forth and illustrated in the attached drawings, in which:

Fig. 3 is a section on the line 3—3, Fig. 1;

Fig. 5 is a fragmentary elevational view showing details of the switch mechanism, and Fig. 6 is a fragmentary sectional view on the line 6—6, Fig. 5.

Fig. 7 is a wiring diagram of my reversing mechanism.

Figure 1:
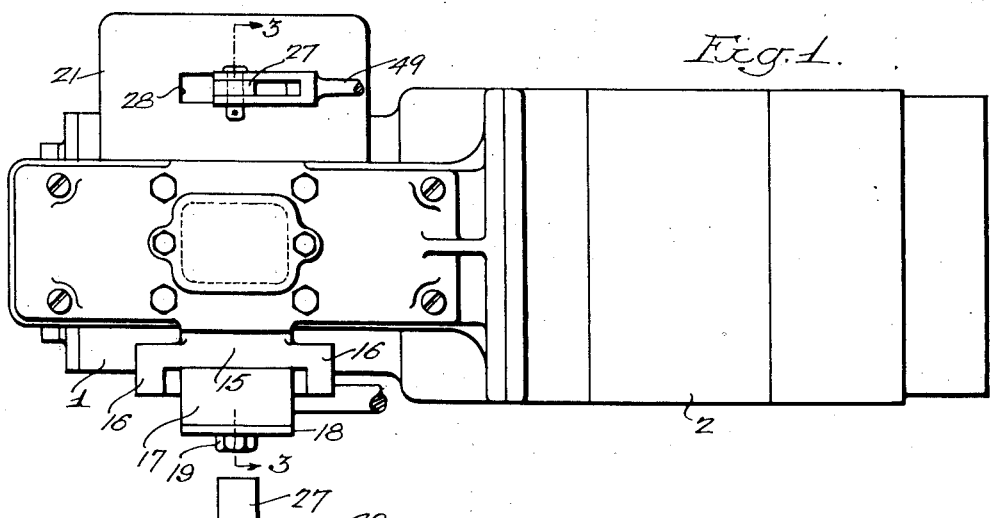
Figure 1 is a plan view of a mechanism made in accordance with my invention.
Figure 4:
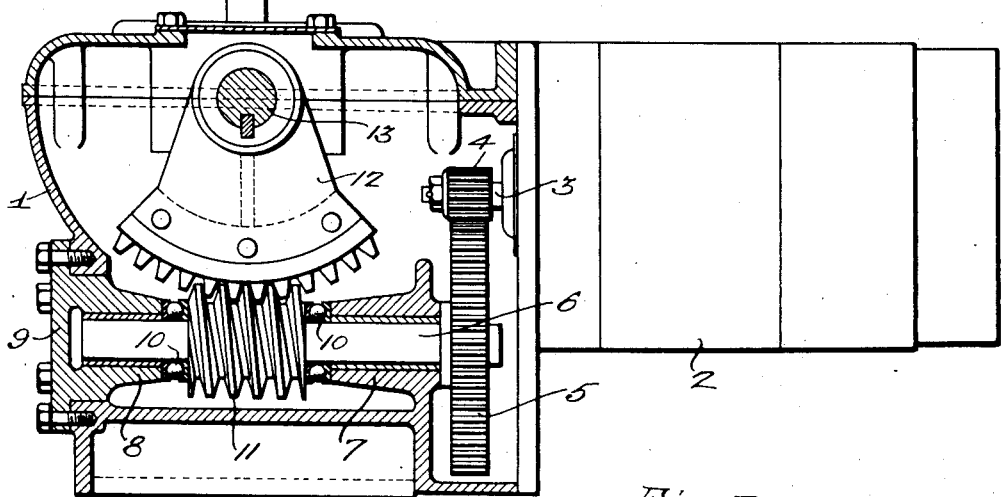
Fig. 4 is a section on the line 4—4, Fig. 3.
Figure 2:
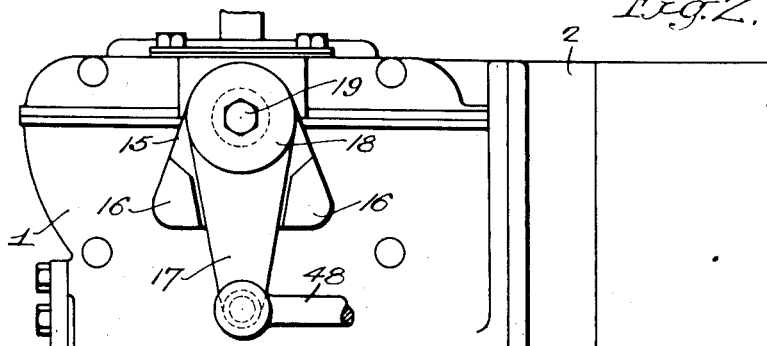
Fig. 2 is a side elevation of the mechanism.

The embodiment of my invention disclosed in the drawings comprises a housing 1 to one end of which is secured an electric motor 2. The motor shaft 3 projects into the housing 1 and carries a pinion 4 (see Fig. 4) which meshes with a gear 5 on a worm shaft 6 journaled in bearings 7 and 8 in the housing. The bearing 7 is in the present instance formed integral with the housing, while the bearing 8 is formed in a member 9 which is secured to the housing by studs and constitutes a closure for an opening in the housing through which the shaft 6 may be inserted. The shaft 6 carries a worm 11 and thrust bearings 10, 10 are interposed between the ends of the worm and the adjacent ends of the bearings 7 and 8. The worm 11 meshes with a segmental worm wheel 12 keyed to a shaft 13, which as shown in Fig. 3 is journaled in bearings 14 in the top of the housing. To one projecting end of the shaft 13 is secured an arm 15 which as shown in Fig. 2 has spaced lugs 16, 16, between which lies a lever 17 loosely mounted on the shaft 13 and held in place by a plate 18 secured to the end of the shaft 13 by a stud 19. Limited play is provided between the lugs 16 and the lever 17.

The other end of the shaft 13 projects into a casing 21 secured to the housing and has secured thereto a member 22 (see Figs. 3 and 5). To this member 22 is secured an insulated plate 23 which carries a pair of segmental contact strips 24 and 25, these strips being arranged concentrically with the shaft 13 and having their adjacent ends spaced part. Loosely mounted on the shaft 13 outwardly of the member 22 is a lever 26 having an arm 27 extending upwardly through a slotted opening 28 in the casing 21 and a second depending arm 29 which carries a contact element 31 adapted to engage the face of the plate 23 and the contact strips 24 and 25 carried thereby. The lever 26 is held in position on the shaft by a plate 32 secured to the end of the shaft by a stud 33.

The details of the contact element 31 are shown in Fig. 6. The arm 29 has attached thereto an extension 34 having at one side thereof a cylinder 35 provided with a cover plate 36. At the inner end of the cylinder 35 the extension 34 is apertured for reception of a plunger 37 into which the contact element 31 is threaded, the latter being locked in position by a lock nut 38. At its inner end the plunger carries a stem 39 which projects through the cover plate 36, and a spring 41 confined between the inner end of the plunger and the cover plate 36 and surrounding the stem 39 exerts a pressure resiliently forcing the plunger and the contact element 31 toward and against the face of the plate 23. The lever 26 may be shifted through the medium of the arm 27 from a neutral position in which the contact element 31 engages the insulated plate intermediate the ends of the contact segments 24 and 25 into engagement with either of the latter as required. Attached to the inner side of the casing 21 at opposite sides of the arm 27 are a pair of lugs 42, 42 into which are threaded set screws 43, 43 positioned in the path of a lug 44 on the lever 26, these set screws constituting stops limiting the angular movement of the lever on the shaft.

The electric motor 2 is of the reversible type shown and described in U. S. Patent to Christian Kramer No. 1,042,692, although it is obvious to those skilled in the art that other types of motors may also be employed. Referring to Fig. 7, the electric motor 2 is provided with field coils 50 and 51 operatively connected to the armature 52 by a conductor 53, the armature being connected to bus bar 54 by a conductor 55. A conductor 45 connects contact segments 24 with field coil 50, a second conductor 46 connects contact segment 25 with field coil 51, and a third conductor 47 connects contact element 31 with bus bar 56, thereby completing the circuit to the motor 2. It therefore is seen that when contact element 31 is moved into engagement with segment 24, field coil 50 will be energized thereby causing the electric motor 2 to rotate in one direction, and vice versa when contact element 31 is moved into engagement with segment 25, field coil 51 will become energized, thereby causing rotation of the motor in the opposite direction.

Assuming for purpose of illustration that the aforedescribed mechanism is utilized for actuating reverse clutch mechanism connecting the propeller of a marine vessel with an engine or motor, the lever 17 will then be connected through a suitable connecting linkage or rod 48 with the movable element of the reverse clutch mechanism, and the arm 27 of the lever 26 may be connected through a rod 49 with a control wheel in the pilot house. Assuming that the parts are in the position shown in the drawings and it is desired to propel the vessel forward, the arm 27 is shifted through the control wheel (not shown) to carry the contact element 31 from the neutral position into engagement with the contact segment 24. This actuates the electric motor 2 in a given direction, which in turn results through the transmission mechanism including the pinion 4, gear 5, worm 11 and worm wheel 12, in a rotation of the shaft 13 in a corresponding direction. The arm 15 moving with the shaft brings one of the lugs 16 into engagement with the lever 17, and through the rod 48 effects an adjustment of the reversing clutch mechanism into a position connecting the propeller with the engine for forward movement of the vessel.

Actuation of the shaft 13 through the motor 2 as described above also effects a movement of the plate 23 in a direction corresponding to the original movement of the lever 26, this movement of the plate 23 continuing until the contact element 31 passes off the inner end of the segment 24 and into the neutral zone between the two segments, at which moment the motor circuit is broken and the operation of the motor interrupted. The extent of movement of the movable clutch element will thus depend directly upon the amount of displacement from the original neutral position of the lever 26, and if it be assumed that a movement of this latter lever from the neutral position in which it is shown in Fig. 5 into contact with one of the stops 42 will be sufficient to completely engage the clutch elements, the said stop will accordingly constitute an accurate gauge as to the throw of the lever 26 necessary to effect said complete clutch engagement. Since the set screws 43 are adjustable in the lugs 42, the position of the screws 43 may be varied as required.

If now it is desired to disengage the clutch, it is only necessary to shift the lever 26 back to its original position, such movement bringing the contact point 31 into engagement with the segmental contact 25 and reversing the motor, such reversal effecting a return movement of the contact plate 23 to its original position, as illustrated in the drawings. If thereafter it be desired to reverse the propeller, a shifting of the lever 26 to bring the contact element 31 into engagement with the segment 25 will cause a shifting of the reversing clutch to make the necessary connection.

The aforedescribed device is characterized by an extreme simplicity and compactness of form, and is highly efficient in operation. While well adapted to the operation of reverse clutch mechanism, it may be found useful in other fields, and there is no restriction in this respect. The mechanism is capable of considerable modification as to detail structure without departure from the invention.

I claim:

In mechanism of the character set forth, the combination with a housing, of a reversible electric motor supported by said housing, a shaft journaled in said housing, and transmission mechanism in the housing connecting the shaft with the motor, an arm secured to said shaft and having spaced abutments, a lever journaled on the said shaft and positioned intermediate the said abutments, a switch member secured to said shaft, a second switch member journaled on said shaft, one of said members having mounted thereon a pair of spaced segmental contact elements and the other of said members having a third contact element adapted normally to be positioned intermediate said segmental elements, said journaled switch member being adjustable to effect selective engagement of the said third contact element with the segmental elements, and said parts being so constructed and arranged that actuation of the motor resulting from engagement of said contact elements effects a relative movement of said switch members returning the contact elements into the relatively neutral position.

CHARLES V. KOONS.